United States Patent
Imao

(10) Patent No.: US 10,181,942 B2
(45) Date of Patent: Jan. 15, 2019

(54) OPTICAL COMMUNICATION SYSTEM, OPTICAL SIGNAL GENERATION DEVICE, AND OPTICAL SIGNAL RECEPTION DEVICE

(71) Applicant: Mitsubishi Electric Corporation, Tokyo (JP)

(72) Inventor: Masataka Imao, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 37 days.

(21) Appl. No.: 15/544,792

(22) PCT Filed: Nov. 12, 2015

(86) PCT No.: PCT/JP2015/081803
§ 371 (c)(1),
(2) Date: Jul. 19, 2017

(87) PCT Pub. No.: WO2016/147474
PCT Pub. Date: Sep. 22, 2016

(65) Prior Publication Data
US 2018/0034619 A1    Feb. 1, 2018

(30) Foreign Application Priority Data

Mar. 16, 2015  (JP) ................. 2015-051758

(51) Int. Cl.
*H04L 7/00*     (2006.01)
*H04B 10/516*   (2013.01)
(Continued)

(52) U.S. Cl.
CPC .......... *H04L 7/0075* (2013.01); *H04B 10/114* (2013.01); *H04B 10/516* (2013.01);
(Continued)

(58) Field of Classification Search
CPC .. H04B 10/114; H04B 10/516; H04B 10/502; H05B 37/02; H04J 14/08; H04L 7/042; H04L 7/0075
See application file for complete search history.

(56) References Cited

U.S. PATENT DOCUMENTS 5,619,361 A    4/1997  Sagesaka et al.
5,717,510 A *  2/1998  Ishikawa ............ H04B 10/0795
                                               398/147
(Continued)

FOREIGN PATENT DOCUMENTS

JP    6-291732 A    10/1994
JP    6-326643 A    11/1994
(Continued)

*Primary Examiner* — Mina Shalaby
(74) *Attorney, Agent, or Firm* — Birch, Stewart, Kolasch & Birch, LLP

(57) ABSTRACT

An optical signal generation device in an optical communication system includes a control signal manager that outputs the number of information sequences and control signals, a timing manager that outputs a timing signal, signal multiplexers that generate multiplexed signal sequences by multiplexing in a time-division manner transmission information sequences and the control signals, pulse converters that convert the multiplexed signal sequences to pulse signal sequences, and transmission processing units that send transmission signal sequences whose intensities correspond to values of the pulse signal sequences. Each control signal includes an identification signal allowing each transmission information sequence to be identified, the timing signals change their values on a cycle of the minimum pulse width of the pulse signal sequences, and time positions at which values of the N timing signals vary are different from one another.

18 Claims, 17 Drawing Sheets

(51) Int. Cl.
*H04J 14/08* (2006.01)
*H04B 10/114* (2013.01)
*H04L 7/04* (2006.01)
*H04B 10/50* (2013.01)

(52) U.S. Cl.
CPC .............. *H04J 14/08* (2013.01); *H04L 7/042* (2013.01); *H04B 10/502* (2013.01)

(56) References Cited

U.S. PATENT DOCUMENTS

| | | | |
|---|---|---|---|
| 6,587,242 B1 * | 7/2003 | Shake | H04B 10/0775 398/98 |
| 6,775,478 B2 * | 8/2004 | Suzuki | H04J 14/0223 398/102 |
| 2003/0231885 A1 * | 12/2003 | Kato | H04J 14/0223 398/98 |
| 2008/0240720 A1 * | 10/2008 | Fujii | H04J 14/0282 398/102 |
| 2015/0016825 A1 | 1/2015 | Haruyama et al. | |

FOREIGN PATENT DOCUMENTS

| | | |
|---|---|---|
| JP | 11-502096 A | 2/1999 |
| JP | 2001-111487 A | 4/2001 |
| JP | 2007-267037 A | 10/2007 |
| JP | 2008-252444 A | 10/2008 |
| JP | 2015-19235 A | 1/2015 |
| WO | WO 97/25788 A1 | 7/1997 |

\* cited by examiner

OPTICAL COMMUNICATION SYSTEM, OPTICAL SIGNAL GENERATION DEVICE, AND OPTICAL SIGNAL RECEPTION DEVICE

TECHNICAL FIELD

The present invention relates to an optical communication system that sends and receives data by means of optical signals and relates to an optical signal generation device and an optical signal reception device that are constitutional elements of the system.

BACKGROUND ART

In recent years, attention is given to optical communication systems that send and receive data by using illumination light of an LED (light emitting diode) illumination device. The optical communication systems using illumination light can be constructed by utilizing already existing infrastructures.

The optical communication system which uses visible light such as illumination light as a communication medium has advantages such as being able to clearly define a range where communication is possible and being able to communicate in an area where use of radio waves is restricted. Accordingly, new uses have been studied, other than a use for supplementing communication by existing wireless communication systems utilizing radio waves and existing infrared communication applications utilizing infrared rays. As a use of the optical communication system utilizing visible light, a use utilizing LED light sources used in outdoor facilities such as a signal lamp and a digital signage is conceivable. For example, new uses such as high-speed data communication, data communication for positioning to assist and control the driving of a vehicle, and data communication for acquiring the information on flow lines of customers in a commercial facility are conceivable.

There is a representative example of the communication method utilizing illumination light that assigns data 1 or 0 (i.e., 1/0) to ON or OFF of a pulse signal, converts ON or OFF of the pulse signal to blinking of an LED, and thereby sends (light-sends) an optical signal (modulated light). In this method, the optical signal reception device detects the optical signal by using a light receiving element and restores the pulse signal from a blinking pattern of the optical signal.

FIG. 1 is a diagram showing a configuration example of an optical communication system utilizing illumination light. In the optical communication system shown in FIG. 1, the optical signal sent from an illumination device #1 is received by a plurality of receiving terminals α, β, and γ. The optical communication system shown in FIG. 1 is applied to a case that common data is distributed to the plurality of receiving terminals α, β, and γ in a communication area, and other cases.

FIG. 2 is a diagram showing another configuration example of the optical communication system utilizing illumination light. In the optical communication system shown in FIG. 2, the optical signal sent from an illumination device #1 is received by a receiving terminal α; the optical signal sent from an illumination device #2 is received by a receiving terminal β; and the optical signal sent from an illumination device #3 is received by a receiving terminal γ. The communication system shown in FIG. 2 is applied to a case that different sets of data are distributed from the plurality of illumination devices #1, #2, and #3 to the plurality of receiving terminals α, β, and γ, respectively, and other cases.

Generally, illumination devices placed to ensure illumination are not supposed to be used as communication devices. In the optical communication system shown in FIG. 1, since data distributed to the receiving terminals α, β, and γ are common data, the interference of sent optical signals does not occur. In the optical communication system shown in FIG. 2, however, there is a possibility that the receiving terminals α, β, and γ detect not only desired optical signals sent from their respective closest illumination devices #1, #2, and #3, but also an unwanted optical signal sent from another nearby illumination device. In other words, in the optical communication system shown in FIG. 2, since the receiving terminals α, β, and γ detect even an unwanted optical signal, there is a possibility that desired optical signals cannot be accurately detected.

As a countermeasure, patent reference 1 proposes an optical communication system in which a transmission device generates a signal string obtained by performing an inverse discrete Fourier transform of each set of a predetermined number of information bits and sends the signal string as an optical signal according to the light emission intensities of a plurality of light emitting elements, and a reception device receives the optical signal sent from the transmission device with a plurality of light receiving elements and performs a discrete Fourier transform of the received signal to restore data. The optical communication system of patent reference 1 eliminates interference caused by unwanted optical signals sent from transmission devices other than a desired transmission device in that way.

PRIOR ART REFERENCE

Patent Reference

Patent reference 1: Japanese patent application publication No. 2008-252444 (Paragraphs 0006 to 0008, FIG. 1)

SUMMARY OF THE INVENTION

Problem to be Solved by the Invention

However, it is common that a large dynamic range is required to use the result of a discrete Fourier transform, so that if the optical communication system proposed by patent reference 1 is adopted, great variations (fluctuations) would occur in the light emission intensity of the plurality of light emitting elements in the transmission device. Consequently, there arises a problem that there is a danger that the reception device could not detect a signal of a weak light emission intensity accurately and fluctuations in illumination intensity could occur.

It is therefore an object of the present invention to provide an optical communication system that suppresses the interference of a plurality of transmission signal sequences and reduces fluctuations and thereby can accurately detect signals of a desired information sequence, and an optical signal generation device and an optical signal reception device that constitute the optical communication system.

Means for Solving the Problem

An optical communication system according to the present invention includes an optical signal generation device and an optical signal reception device. The optical signal generation device includes: a control signal manager that outputs an information sequence number indicating a number of N transmission information sequences, N being an integer not smaller than 2, and N control signals corresponding to the N transmission information sequences; a timing manager that outputs N timing signals indicating time positions different from one another; N signal multiplexers that multiplex in a time-division manner transmission information sequences and control signals corresponding to each other, of the N transmission information sequences and the N control signals, and thereby generate N multiplexed signal sequences; N pulse converters that convert the N multiplexed signal sequences to N pulse signal sequences whose values change at the time positions based on the N timing signals corresponding to the N multiplexed signal sequences; and N transmission processing units that send N transmission signal sequences whose intensities correspond to values of the N pulse signal sequences. The optical signal reception device includes: M reception processing units that receive M signal sequences of the N transmission signal sequences as reception signal sequences, M being a positive integer, convert intensities of the M reception signal sequences to amplitude, and thereby generate M analysis signals; M control signal detectors that generate M synchronization signals that periodically vary, from the M analysis signals; and M information detectors that detect M reception information sequences from the M analysis signals, based on periods of the M synchronization signals. The N control signals include identification signals that allow each of the N transmission information sequences to be identified. The N timing signals are signals whose values change on a cycle of a minimum pulse width of the N pulse signal sequences, and the time positions at which values of the N timing signals vary are different from one another.

Further, an optical signal generation device according to the present invention includes: a control signal manager that outputs an information sequence number indicating a number of N transmission information sequences, N being an integer not smaller than 2, and N control signals corresponding to the N transmission information sequences; a timing manager that outputs N timing signals indicating time positions different from one another; N signal multiplexers that multiplex in a time-division manner transmission information sequences and control signals corresponding to each other, of the N transmission information sequences and the N control signals, and thereby generate N multiplexed signal sequences; N pulse converters that convert the N multiplexed signal sequences to N pulse signal sequences whose values change at the time positions based on the N timing signals corresponding to the N multiplexed signal sequences; and N transmission processing units that send N transmission signal sequences whose intensities correspond to the values of the N pulse signal sequences. The N control signals include identification signals that allow each of the N transmission information sequences to be identified. The N timing signals are signals whose values change on a cycle of a minimum pulse width of the N pulse signal sequences, and the time positions at which the values of the N timing signals vary are different from one another.

Furthermore, an optical signal reception device according to the present invention includes: M reception processing units that receive M signal sequences of N transmission signal sequences as reception signal sequences, M being a positive integer, convert intensities of the M reception signal sequences to amplitude, and thereby generate M analysis signals; M control signal detectors that generate M synchronization signals that periodically vary, from the M analysis signals; and M information detectors that detect M reception information sequences from the M analysis signals, based on periods of the M synchronization signals.

Effect of the Invention

According to the optical communication system of the present invention, it is possible for the optical signal generation device to generate control signals including identification signals corresponding to a plurality of information sequences and output the plurality of information sequences into which the control signals are multiplexed individually at different times. Therefore, by detecting the identification signals by the optical signal reception device, a time at which a desired optical modulation signal is received is known simultaneously with the detection, and therefore there is an effect that the interference of optical signals emitted from a plurality of light sources can be suppressed and only a desired optical signal can be accurately detected, while stable illumination intensity is maintained.

Since only by changing, in the optical signal generation device, a slot time position used for pulse conversion of the information sequences into which the identification signals are multiplexed, according to the number of information sequences, it is possible for the optical signal reception device to identify a desired optical modulation signal uniquely. Therefore, there is an effect that the amount of computation necessary for suppressing the interference of optical signals emitted from a plurality of light sources can be reduced.

MODE FOR CARRYING OUT THE INVENTION

Embodiments of the present invention will be described below. Each of the embodiments will explain an optical communication system that sends and receives data by utilizing an optical signal as a communication medium, and an optical signal generation device and an optical signal reception device that are constitutional elements of the system. As the optical signal, visible light can be utilized. The present invention, however, can be also applied to an optical signal having a wavelength longer than that of visible light or to an optical signal having a wavelength shorter than that of visible light. The optical signal generation device is, for example, an illumination device having a light emitting element such as an LED light source. The optical signal reception device is, for example, an information terminal device having a light receiving element. However, as long as the optical signal generation device is a device including a light emitting element, it can be also applied to a device (e.g., a signal lamp, a display device, and so forth) other than the illumination device. Further, as long as the optical signal reception device is a device including a light receiving element, it can be applied to, for example, a variety of electric apparatuses such as mobile phones, smartphones, tablet information terminals, personal computers, video equipment, audio equipment, and air-conditioning equipment.

<1> First Embodiment

<1-1> Configuration of First Embodiment

Figure 1:
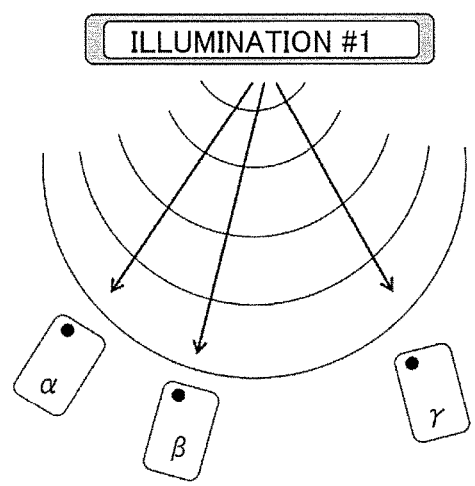
FIG. 1 is a diagram illustrating a configuration example of an optical communication system utilizing illumination light.
Figure 2:
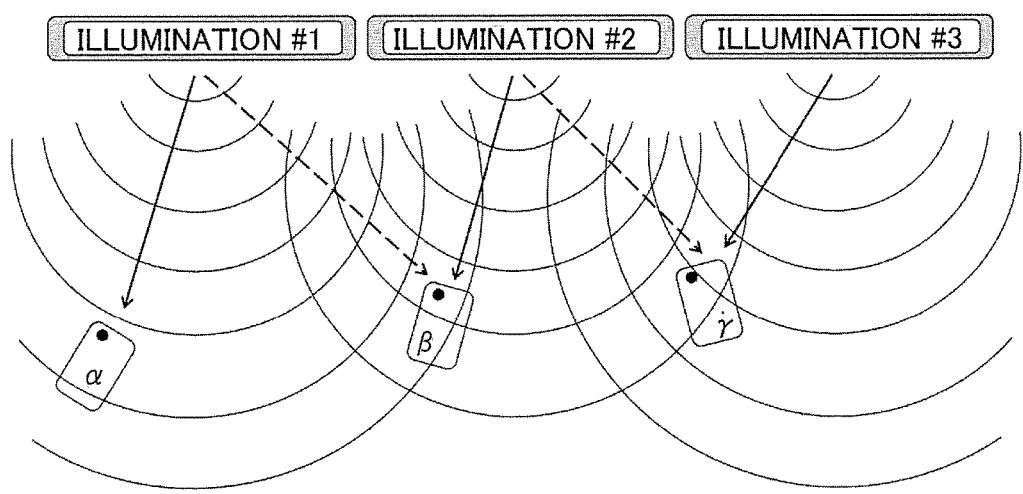
FIG. 2 is a diagram illustrating another configuration example of an optical communication system utilizing illumination light.
Figure 3:
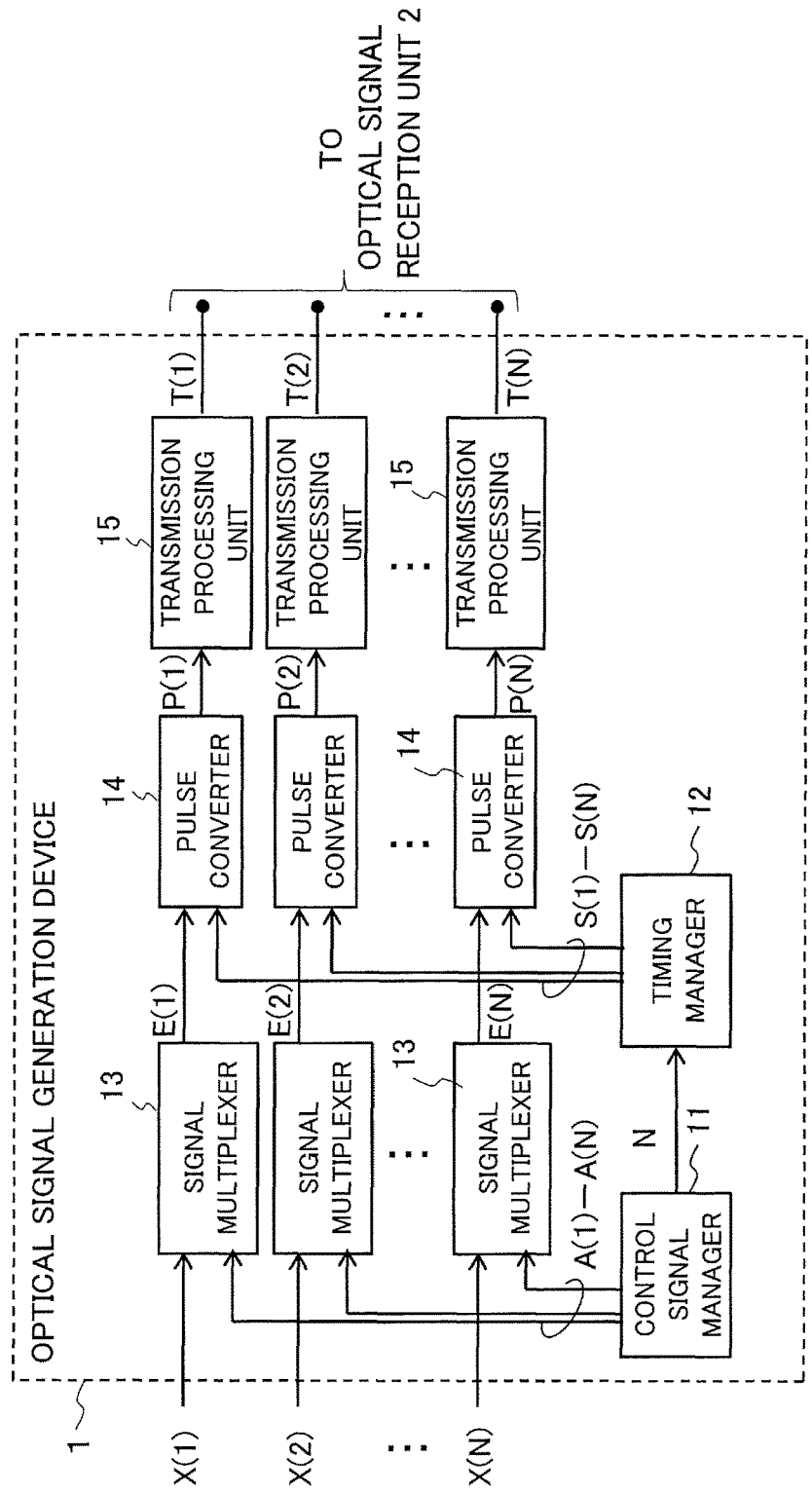
FIG. 3 is a block diagram showing a configuration example of an optical signal generation device included in an optical communication system according to a first embodiment of the present invention.
Figure 4:
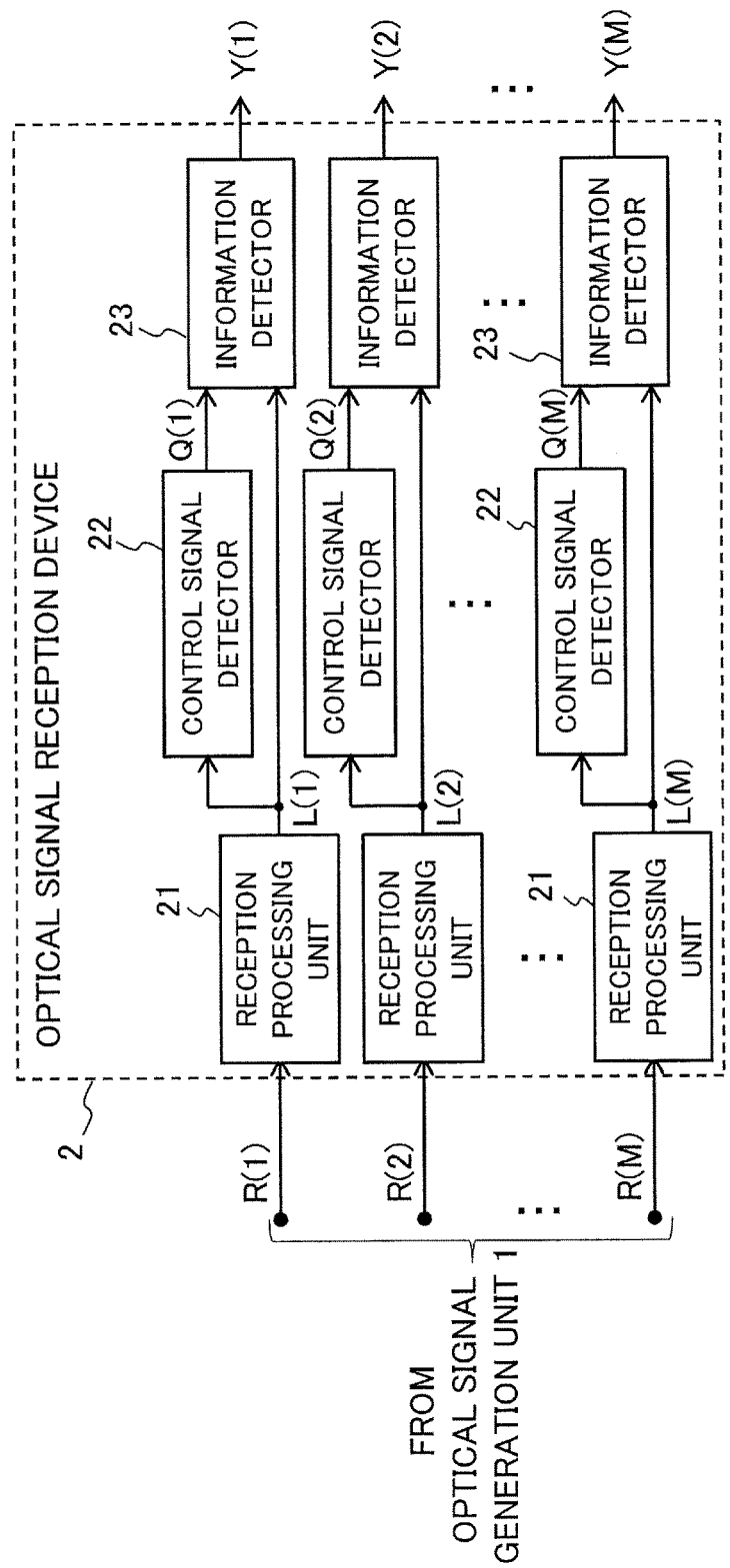
FIG. 4 is a block diagram showing a configuration example of an optical signal reception device included in the optical communication system according to the first embodiment.

FIG. 3 is a block diagram showing a configuration example of an optical signal generation device 1 included in an optical communication system according to a first embodiment of the present invention. FIG. 4 is a block diagram showing a configuration example of an optical signal reception device 2 included in the optical communication system according to the first embodiment. The optical communication system includes the optical signal generation device 1 and the optical signal reception device 2.

The optical signal generation device 1 includes a control signal manager 11, a timing manager 12, and N signal multiplexers 13, N pulse converters 14, and N transmission processing units 15. Here, N is an integer not smaller than 2. The control signal manager 11 outputs the number of information sequences N indicating the number of N (N types of) transmission information sequences X(1) to X(N), and N control signals A(1) to A(N) corresponding to the N transmission information sequences. The N transmission information sequences X(1) to X(N) are digital signal sequences expressed by 1 or 0, for example. The timing manager 12 outputs N timing signals S(1) to S(N) representing time positions $S_1$ to $S_N$ different from one another (shown in FIG. 5 to FIG. 7 which will be described later). The N signal multiplexers 13 generate N (N types of) multiplexed signal sequences E(1) to E(N) by multiplexing in a time-division manner a transmission information sequence X(k) and a control signal A(k) corresponding to each other, of the N transmission information sequences X(1) to X(N) and the N control signals A(1) to A(N). Here, k is an integer satisfying 1≤k≤N. The N pulse converters 14 convert the N multiplexed signal sequences E(1) to E(N) to N pulse signal sequences P(1) to P(N) whose values change at time positions $S_1$ to $S_N$ based on the N timing signals S(1) to S (N) corresponding to the N multiplexed signal sequences E(1) to E(N). The N transmission processing units 15 send N transmission signal sequences T(1) to T(N) whose intensities correspond to the values of the N pulse signal sequences P(1) to P(N). The N control signals A(1) to A(N) include identification signals H(1) to H (N) allowing the N transmission information sequences X(1) to X(N) to be identified. In addition, the N timing signals S(1) to S(N) are signals whose values change on a cycle of the minimum pulse width (shown in FIG. 12 which will be described later) of the N pulse signal sequences P(1) to P(N), and the time positions $S_1$ to $S_N$ at which the change in the values of the N timing signals S(1) to S(N) occurs are different from one another.

The optical signal reception device 2 includes M reception processing units 21, M control signal detectors 22, and M information detectors 23. Here, M is a positive integer. The M reception processing units 21 receive M signal sequences of the N transmission signal sequences T(1) to T(N) as reception signal sequences R(1) to R(M), convert the intensities of the M reception signal sequences R(1) to R(M) into amplitude, and thereby generate M analysis signals L(1) to L(M). The M control signal detectors 22 generate M synchronization signals Q(1) to Q(M) that periodically varies, from the M analysis signals L(1) to L(M). The M information detectors 23 detect M reception information sequences Y(1) to Y(M) from the M analysis signals L(1) to L(M), based on periods of the M synchronization signals Q(1) to Q(M). In the description given below, a case that M=N will be explained.

As described above, in the optical signal generation device 1, the control signals A(1) to A(N) including identification signals corresponding to the plurality of transmission information sequences X(1) to X(N) are generated, and the plurality of transmission signal sequences T(1) to T(N) multiplexed with the control signals A(1) to A(N) can be output individually at different timings. Accordingly, when the optical signal reception device 2 detects an identification signal, the reception timing of a desired optical modulation signal is known simultaneously, so that the optical signal reception device 2 can suppress the interference of the optical signals corresponding to the output of the N transmission processing units 15 of the optical signal generation device 1 and can detect just the desired optical signal accurately. In addition, unlike the system disclosed in patent reference 1, the optical communication system to which the present invention is applied does not require great variations in light emission intensity of the plurality of light emitting elements, so even if part of the optical signal generation device 1 is configured by an illumination device, stable illumination can be maintained.

<1-2> Operation of First Embodiment

<1-2-1> Optical Signal Generation Device 1

The control signal manager 11 shown in FIG. 3 outputs the number of the information sequences N indicating the number of received N types of transmission information sequences X(1) to X(N) and N types of control signals A(1) to A(N). The N types of control signals A(1) to A(N) respectively include identification signals H(1) to H(N) for identifying the transmission information sequences X(1) to X(N). The identification signals H(1) to H(N) are index values, for example, and can be defined as given by following expression (1).

$$H(k)=k \quad (1)$$

Here, k is an integer satisfying $1 \leq k \leq N$.

If the illumination devices for transmitting the N types of transmission signal sequences T(1) to T(N) based on the N types of transmission information sequences X(1) to X(N) are separate independent devices, the identification signals H(1) to H(N) can be used as IDs (identification information) corresponding to the respective illumination devices.

The N types of control signals A(1) to A(N) can include preamble signals for indicating start time positions of the N types of transmission information sequences X(1) to X(N) and frame type signals for indicating the types, attributes, and the like of the N types of transmission information sequences X(1) to X(N), as well as the N types of identification signals H(1) to H(N).

The timing manager 12 shown in FIG. 3 has a function of holding a value corresponding to a signal rate, that is, the minimum pulse width (time width) (shown in FIG. 12 which will be described later) of a pulse signal, which will be described later, and outputs N types of timing signals S(1) to S(N) whose values change on a cycle of the minimum pulse width. Here, the time positions at which the respective values of the N types of timing signals S(1) to S(N) vary are different from one another. A time width obtained by dividing the minimum pulse width mentioned earlier by a value not smaller than the number of the information sequences N is referred to as a time width of a slot. It is preferable that the N types of timing signals S(1) to S(N) be signals whose values change in synchronization with the slot boundaries. The time width of the slot is indicated as, for example, a duration between time positions $S_1$ and $S_2$, a duration between time positions $S_2$ and $S_3$, a duration between time positions $S_3$ and $S_4$, and a duration between time positions $S_4$ and $S_1$ in FIG. 5, which will be described later. Further, the time width of the slot is indicated as, for example, a duration between time positions $S_1$ and $S_2$, a duration between time positions $S_2$ and $S_3$, a duration between time positions $S_3$ and $S_4$, a duration between time positions $S_4$ and $S_5$, and a duration between time positions $S_5$ and $S_6$ in FIG. 6, which will be described later.

If the signal rate of each of the N types of transmission information sequences X(1) to X(N) is fs [Hz] and the minimum pulse width of the pulse signal sequences P(1) to P(N) is 1/fs [seconds], the time positions (rising time positions) $S_1$ to $S_N$ at which the timing signals S(1) to S(N) are generated can be defined as given by following expression (2), for example.

$$S_k=(k \times 1) \times (1/\text{fs})/(N+n) \quad (2)$$

Here, k is an integer satisfying $1 \leq k \leq N$, n is an integer not smaller than 0, and N is the number of the information sequences.

Figure 5:
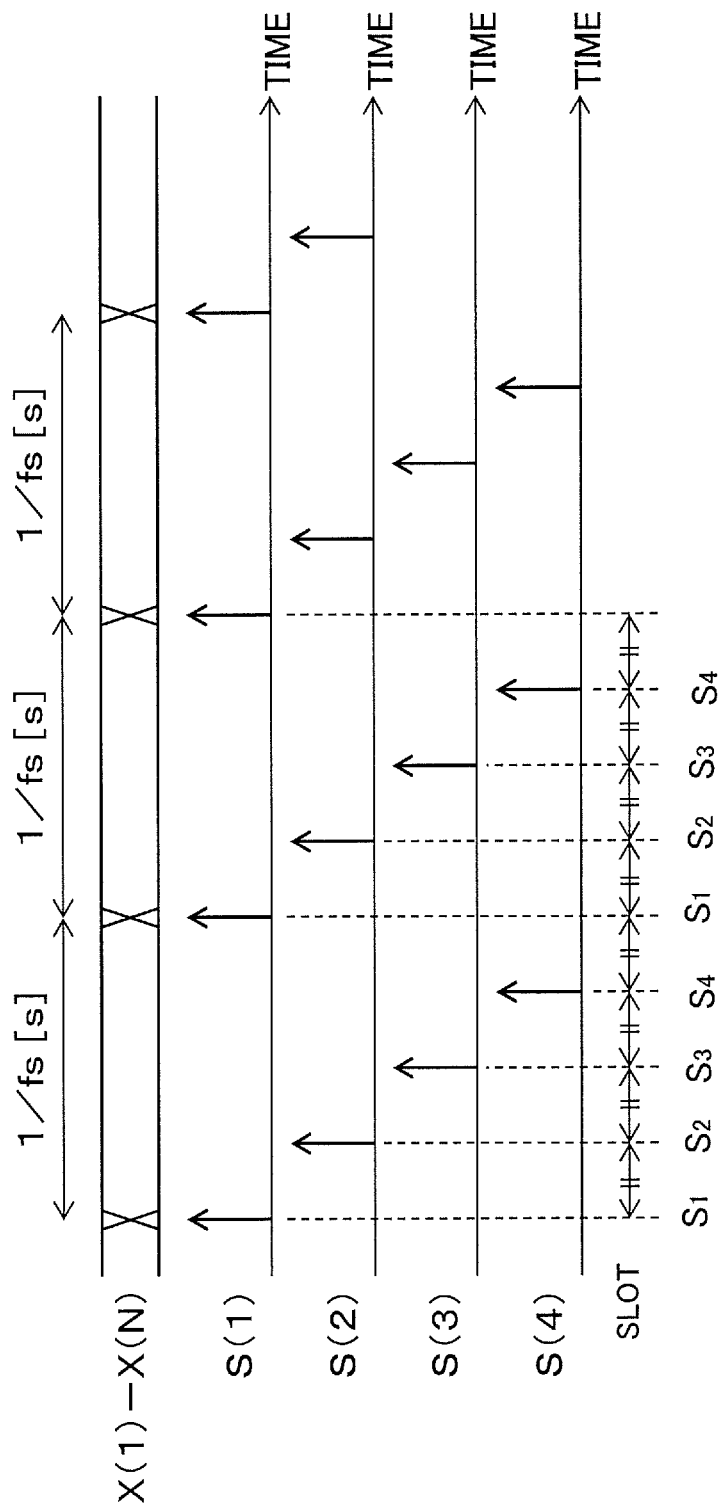
FIG. 5 is a timing diagram showing an operation example of a timing manager of the optical signal generation device shown in FIG. 3.

FIG. 5 is a timing diagram showing an operation example of the timing manager 12 of the optical signal generation device 1 shown in FIG. 3. FIG. 5 shows the rising time positions $S_1$ to $S_4$ of the timing signals S(1) to S(4) generated by the timing manager 12, by using expression (2) when N=4 and n=0. FIG. 5 shows an example in which components, each of which is one bit of a digital signal, of four types of transmission information sequences X(1) to X(4) forms one pulse width (1/fs).

Figure 6:
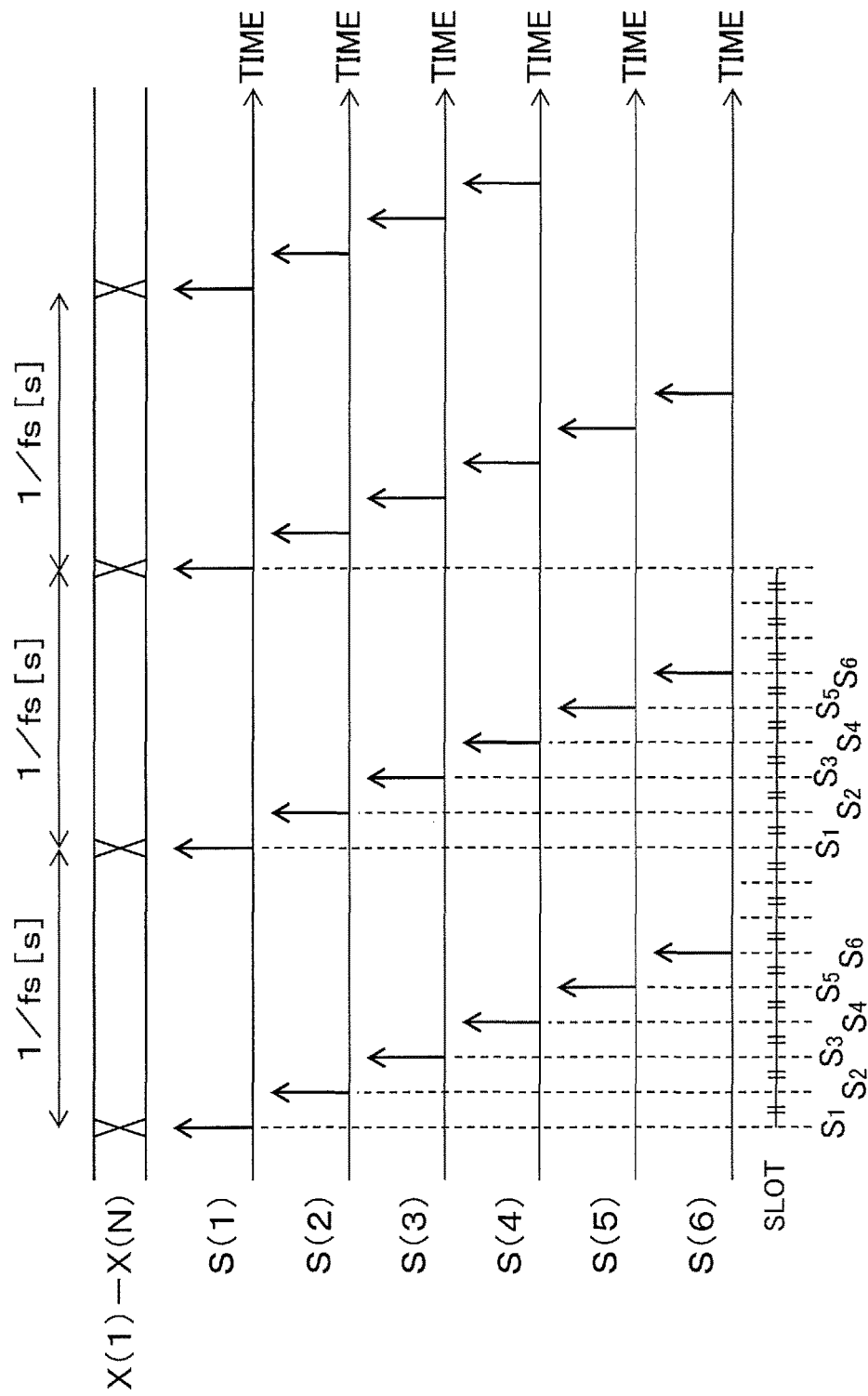
FIG. 6 is a timing diagram showing another operation example of the timing manager of the optical signal generation device shown in FIG. 3.

FIG. 6 is a timing diagram showing another operation example of the timing manager 12 of the optical signal generation device 1 shown in FIG. 3. FIG. 6 shows rising time positions $S_1$ to $S_6$ of the timing signals S(1) to S(6) generated by the timing manager 12 by using expression (2) when N=6 and n=2. FIG. 6 shows an example in which components, each of which is one bit of a digital signal, of six types of transmission information sequences X(1) to X(6) forms one pulse width (1/fs).

The N types of timing signal S(1) to S(N) can also be defined as given by following expression (3), for example. As the value of c, however, different values can be set with respect to the rising time positions $S_1$ to $S_N$ of the N types of timing signals S(1) to S(N).

$$S_k=(c-1) \times (1/\text{fs})/(N+n) \quad (3)$$

Here, $c \in \{1, 2, \ldots, N\}$ and n is an integer not smaller than 0, and N is the number of the information sequences.

Figure 7:
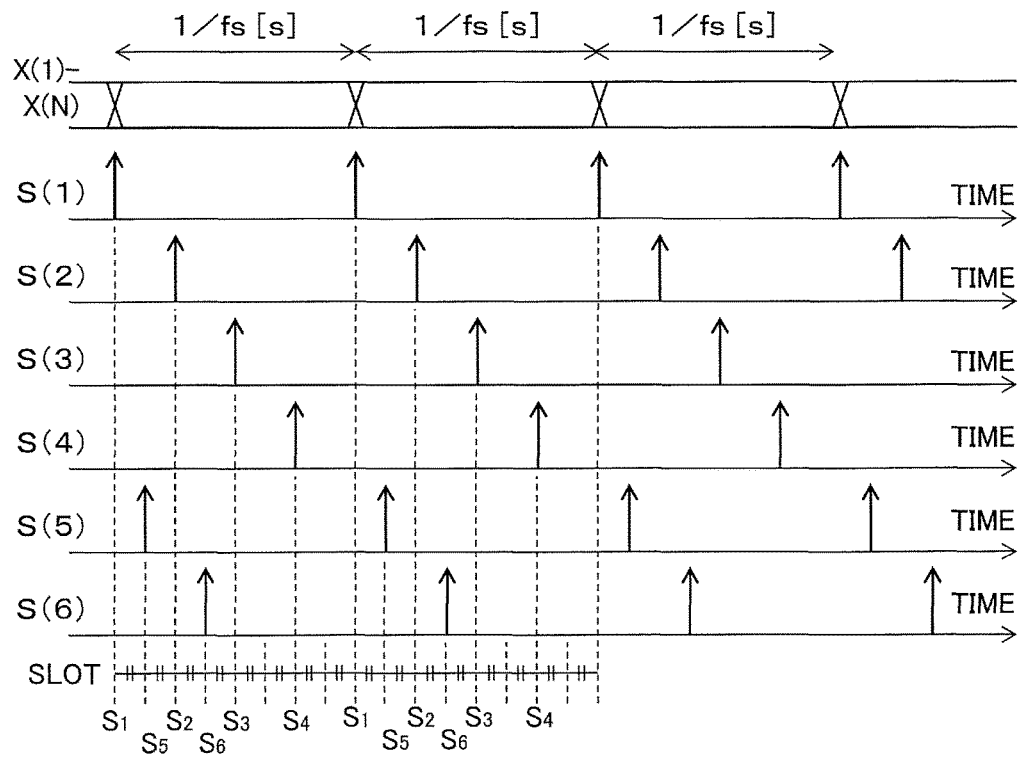
FIG. 7 is a timing diagram showing a further operation example of the timing manager of the optical signal generation device shown in FIG. 3.

FIG. 7 is a timing diagram showing a further operation example of the timing manager 12 of the optical signal generation device 1 shown in FIG. 3. FIG. 7 shows the rising time position $S_1$ to $S_6$ of the timing signals S(1) to S(6) generated by the timing manager 12, by using expression (3) when N=6 and n=2. FIG. 7 shows an example in which components, each of which is one bit of a digital signal, of six types of transmission information sequences X(1) to X(6) forms one pulse width (1/fs). In the cases of FIG. 5 and FIG. 6, the value of k is incremented by 1, starting from 1, and a smaller value of k represents an earlier time position of the rising time positions of the timing signals (that is, the rising time positions are in the order of $S_1$, $S_2$, $S_3$, $S_4$, $S_5$, and $S_6$). In the case of FIG. 7, however, since the value of c in expression (3) can be varied as desired, the rising time positions of the timing signals S(1) to S(6) can be set in the order of $S_1$, $S_5$, $S_2$, $S_6$, $S_3$, and $S_4$, as shown in FIG. 7.

The signal multiplexer 13 shown in FIG. 3 has a function of multiplexing in a time-division manner a control signal A (k) corresponding to the kth transmission information sequence X (k) and outputting a multiplexed signal sequence E(k). The optical signal generation device 1 includes N signal multiplexers 13 having the same functions for the N types of transmission information sequences X(1) to X(N).

Figure 8:
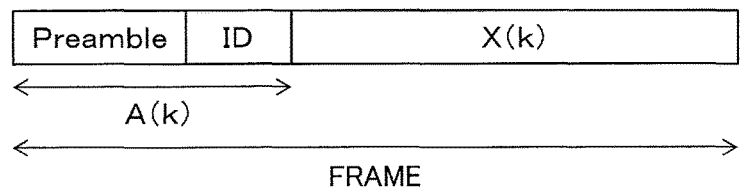
FIG. 8 is a diagram showing a structural example of a frame of data generated by each of signal multiplexers of the optical signal generation device shown in FIG. 3.

FIG. 8 is a diagram showing a structural example of a frame of data (multiplexed signal) generated by each of the signal multiplexers 13 of the optical signal generation device 1 shown in FIG. 3. As shown in FIG. 8, the signal multiplexer 13 generates data obtained by time-division multiplexing the transmission information sequence X(k) and the control signal A(k). In FIG. 8, the control signal A(k) includes a preamble and an identification signal H(k) (ID). As described above, the signal multiplexer 13 can output a signal generated by time-division multiplexing, as a multiplexed signal sequence E(k).

Figure 9:
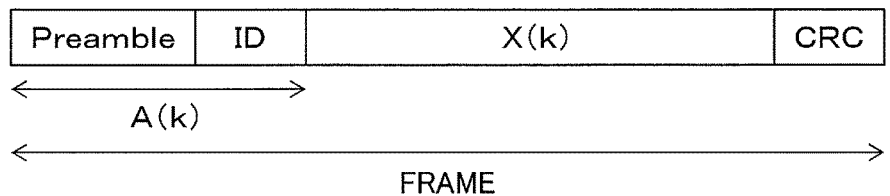
FIG. 9 is a diagram showing another structural example of a frame of data generated by each of the signal multiplexers of the optical signal generation device shown in FIG. 3.

FIG. 9 is a diagram showing another structural example of a frame of data generated by each of the signal multiplexers 13 of the optical signal generation device 1 shown in FIG. 3. The signal multiplexer 13 can also output a signal obtained by adding a signal for checking an error (CRC: Cyclic Redundancy Code) generated according to the transmission information sequence X(k) to the signal generated by time-division multiplexing in the method shown in FIG. 8, as a multiplexed signal sequence E(k). FIG. 9 shows an example of a case that the signal multiplexer 13 outputs, as the multiplexed signal sequence E(k), a signal including the transmission information sequence X(k) followed by the CRC in the time-division multiplexing manner.

Figure 10:
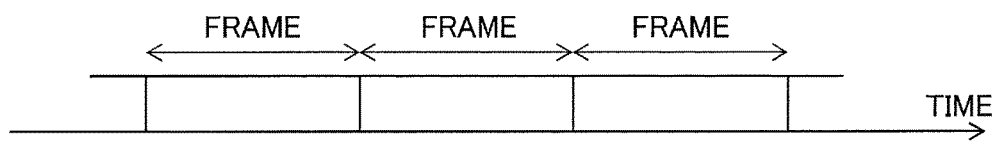
FIG. 10 is a diagram showing a structural example of a plurality of frames of data generated by each of the signal multiplexers of the optical signal generation device shown in FIG. 3.
Figure 11:
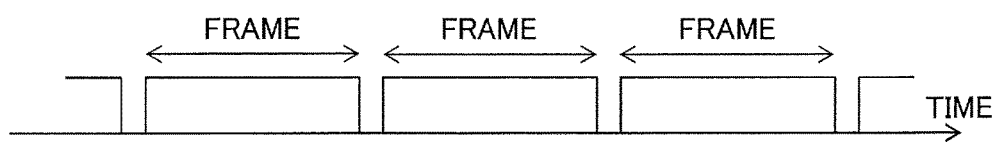
FIG. 11 is a diagram showing another structural example of the plurality of frames of data generated by each of the signal multiplexers of the optical signal generation device shown in FIG. 3.

If the multiplexed signal sequence E(k) including the control signal A (k), the transmission information sequence X (k), and the CRC (CRC is not added in some cases) is supposed as a one-frame unit, the signal multiplexer 13 has also a function of controlling a starting time position of each frame. For example, the signal multiplexer 13 can perform such control that adjacent frames continue in terms of time, as shown in FIG. 10. The signal multiplexer 13 can also perform such control that the adjacent frames are placed intermittently on a time axis, as shown in FIG. 11.

The pulse converter 14 shown in FIG. 3 has a function of converting the multiplexed signal sequence E(k) to a pulse, based on the kth timing signal S(k) and outputting it as a pulse signal sequence P(k). The optical signal generation device 1 includes N pulse converters 14 having the same functions for the N types of multiplexed signal sequences E(1) to E(N).

As shown in FIG. 5 to FIG. 7, all the rising time positions $S_1$ to $S_N$ of the N types of timing signals S(1) to S(N) are different. In each of the N types of timing signals S(1) to S(N), all the intervals between adjacent rising time positions (that is, an interval between two adjacent rising time positions $S_k$) are equal to the minimum pulse width. Accordingly, if the rising time positions of the N types of timing signals S(1) to S(N) are the time positions of the pulse boundaries and the pulse signal sequences P(1) to P(N) are generated by converting the values, 1 or 0, of the N types of multiplexed signal sequences E(1) to E(N) to ON or OFF pulses, the time positions of the pulse boundaries, which are the rising time positions of the pulse signal sequences P(1) to P(N), become different time positions for all of the pulse signal sequences P(1) to P(N).

Figure 12:
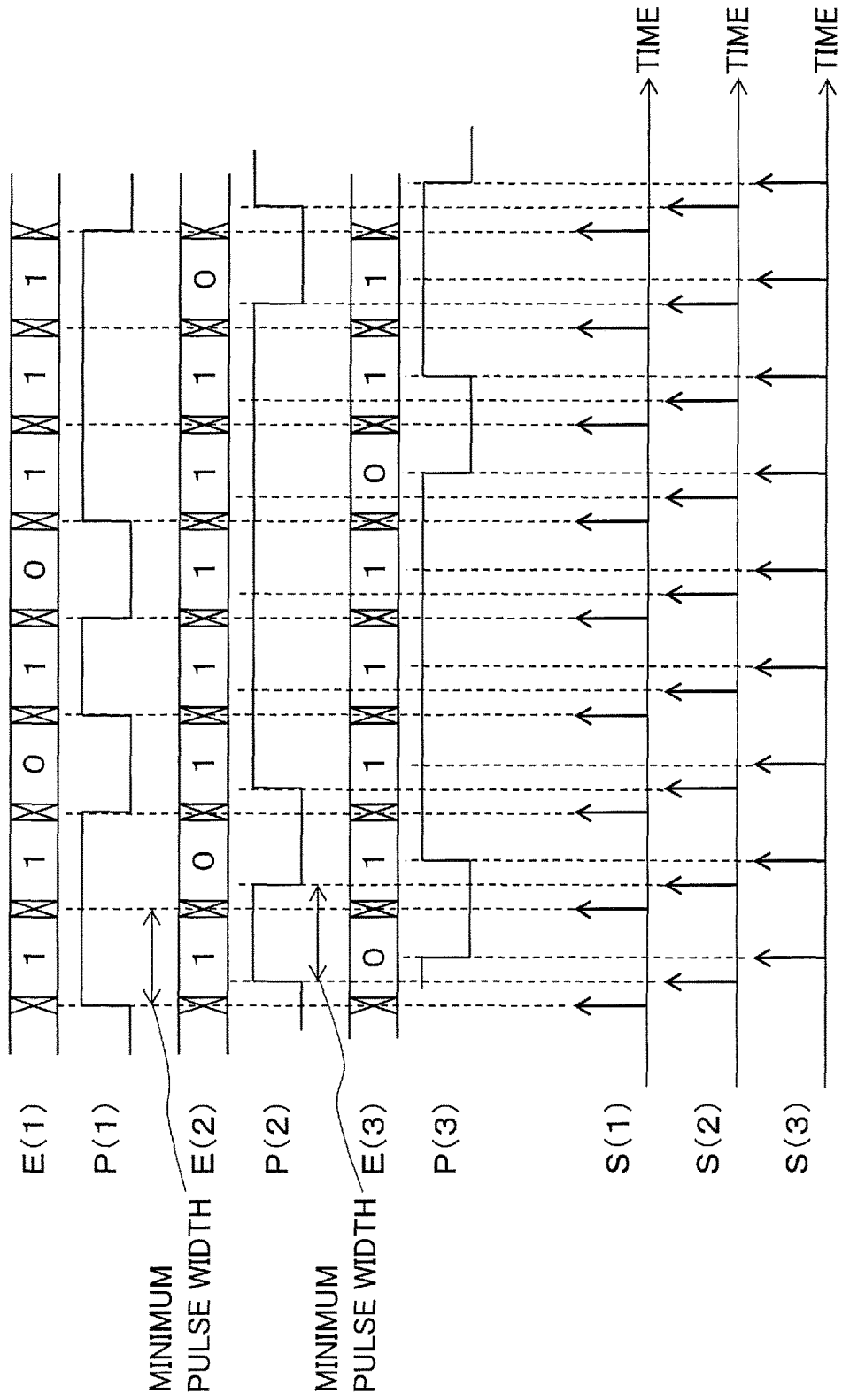
FIG. 12 is a timing diagram showing an operation example of each of pulse converters of the optical signal generation device shown in FIG. 3.

FIG. 12 is a timing diagram showing an operation example of each of the pulse converters 14 of the optical signal generation device 1 shown in FIG. 3. FIG. 12 shows a state of pulse conversion when N=3. As can be understood from FIG. 12, all the time positions of the pulse boundaries of the pulse signal sequences P(1) to P(3) become different from one another.

In FIG. 3, the transmission processing unit 15 has a function of converting the values (0 or 1) of a kth pulse signal sequence P(k) to intensities. The optical signal generation device 1 includes N transmission processing units 15 having the same functions for the N types of pulse signal sequences P(1) to P(N). The information on the intensities generated by the transmission processing unit 15 can be associated with the light emission intensity of the light emitting element. As the light emitting element, an illumination lamp utilizing an LED as a light source, for example, can be used.

<1-2-2> Optical Signal Reception Device 2

As shown in FIG. 4, the optical signal reception device 2 receives M types of reception signal sequences R(1) to R(M) as input signals, performs predetermined signal processing of the M types of reception signal sequences R(1) to R(M), and outputs M types of restored signal sequences (reception information sequences) Y(1) to Y(M). For example, if there is one to one correspondence between the transmission processing units 15 of the optical signal generation device 1 and the reception processing units 21 of the optical signal reception device 2 in the optical communication system, N=M. In order to simplify the explanation, on the assumption that N=M, a case that an optical signal sent from a kth light emitting element is received by a kth light receiving element and signal processing is performed will be explained below. In other words, to make the restored signal sequence Y(k) identical to the transmission information sequence X(k) is a desired signal processing operation. Even if N M, the same signal processing can be adopted.

The reception processing unit 21 shown in FIG. 4 has a function to detect the intensity of an optical signal corresponding to the transmission signal sequence sent from the transmission processing unit 15, to convert it to amplitude, and thereby to output an analysis signal L(k). The optical signal reception device 2 includes M reception processing units 21 having the same functions for M (M types of) reception signal sequences R(1) to R(M). As described earlier, the analysis signal L(k) includes, in some cases, components of transmission signal sequences T(1), T(2), . . . , T(k−1), T(k+1), . . . , T(N) other than the transmission signal sequence T(k), as well as the transmission signal sequence T(k).

The control signal detector 22 shown in FIG. 4 has a function of detecting a control signal multiplexed with an information sequence from the analysis signal L(k) and to output a synchronization signal Q(k). The optical signal reception device 2 includes M control signal detectors 22 having the same functions for the M types of analysis signals L(1) to L(M). The control signal detector 22 also has a function of holding the number of the information sequences M and a value corresponding to a signal rate, that is, the minimum pulse width of the pulse signal. Ideally, the synchronization signal Q(k) should be a signal rising periodically in synchronization with the time positions of pulse boundaries of the transmission information sequence X(k) included in the transmission signal sequence T(k).

Figure 13:
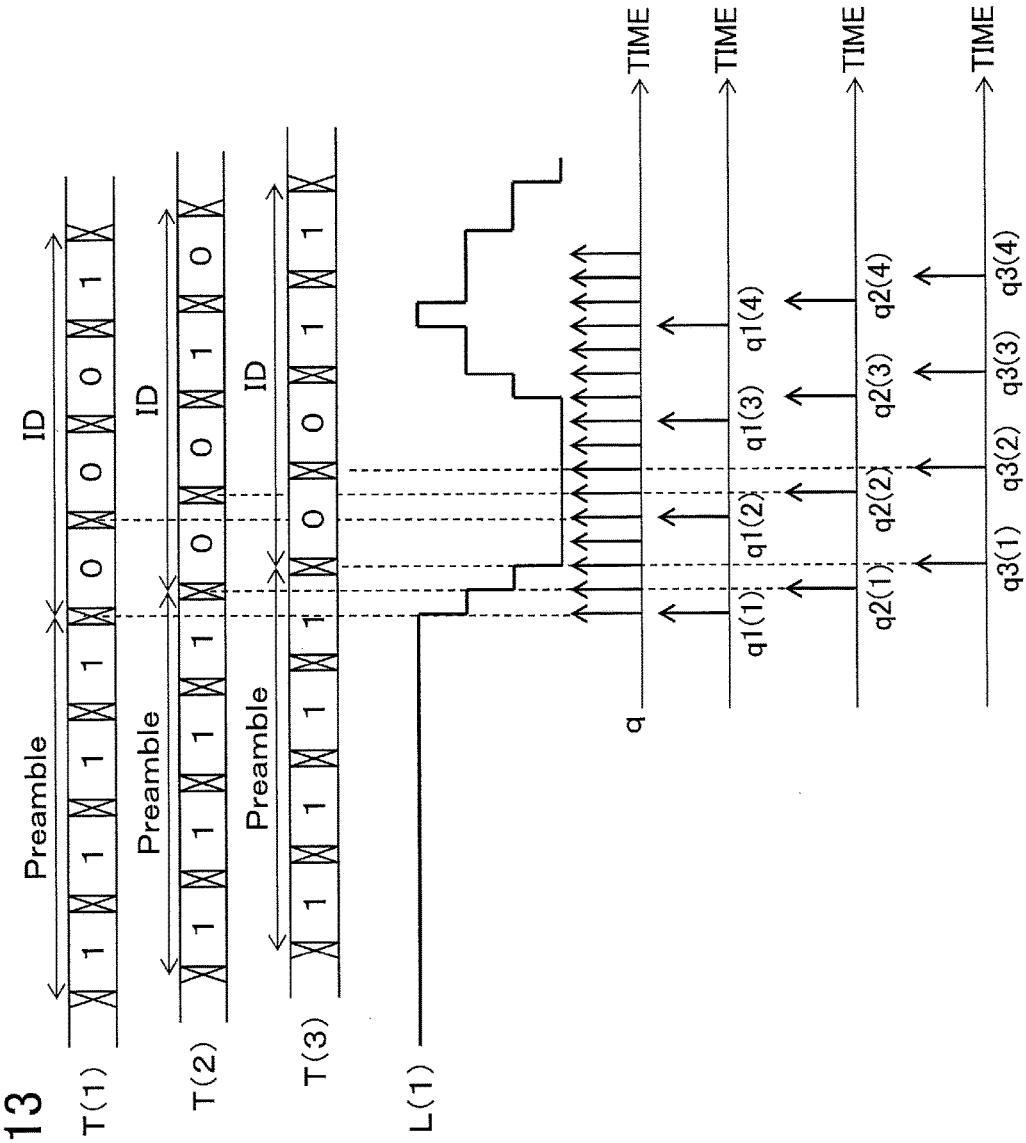
FIG. 13 is a timing diagram showing an operation example of a control signal detector of the optical signal reception device shown in FIG. 4.

FIG. 13 is a timing diagram showing an operation example of the control signal detector 22 of the optical signal reception device 2 shown in FIG. 4. Supposing that M=N=3 and the identification signals H(1) to H(3) are defined by a four-bit preamble "1111" and the ID given by expression (1), the analysis signal L(1) when k=1 is expressed as shown in FIG. 13. Usually, different gains are superimposed on T(1), T(2), and T(3), and a signal obtained by adding them up is calculated as the analysis signal L(1). However, in order to simplify the explanation, it is assumed below that an equal gain is superimposed on all the optical signals.

Since the control signal detector 22 holds the number of the information sequences N, the control signal detector 22 can perform a control signal detection operation, using a value obtained by dividing the minimum pulse width mentioned earlier by the number of the information sequences N as a sampling time interval. FIG. 13 shows an example of a case that expression (2) is used and N=3 and n=1, and a sampling point corresponding to the sampling time interval mentioned earlier is represented by a signal q.

The signal q is divided into signals in N detection systems, according to the value of the number of the information sequences N. Since N=3 in the example shown in FIG. 13, the division is made for the three systems, which are detection system q1, detection system q2, and detection system q3. Among these three systems, a sampling timing corresponding to a desired signal of k=1 is detected. Here, the ID corresponding to the desired signal has been specified in advance by referring to the ID table held by the optical communication system and so forth.

Each detection system monitors variations in the value of the analysis signal L(1) at sampling points. For example, since L(1) falls at the timing of q1(1), the detection system q1 supposes that the value immediately before the fall is 1, and the value immediately after the fall is 0. Likewise, since L(1) does not change at the timing of q1(2), it is judged that the value 0 is retained. By repeating such a judgment at q1(1) to q1(4), ID "0001" is detected.

Meanwhile, the ID is detected as "0010" in the detection system q2, and the ID is detected as "0011" in the detection system q3. Therefore, it can be judged that the detection system q1 has a sampling timing corresponding to the desired signal of k=1 and thereby a signal rising periodically in synchronization with the time positions of the pulse boundaries starting from q1(1) is output as the synchronization signal Q(1).

As shown in FIG. 13, if the identification signals H(1) to H(3) include preambles, a preamble detection operation is performed by using the minimum pulse width mentioned earlier as the sampling time interval, and at a point of time when the preamble is detected, the control signal detection operation can be performed by using a value obtained by dividing the minimum pulse width mentioned earlier by the number of the information sequences N as the sampling time interval.

The information detector 23 shown in FIG. 4 has a function of detecting a restored signal sequence Y(k) from the analysis signal L(k), based on the kth synchronization signal Q(k). The optical signal reception device 2 includes M information detectors 23 having the same functions for M types of analysis signals L(1) to L(M).

Figure 14:
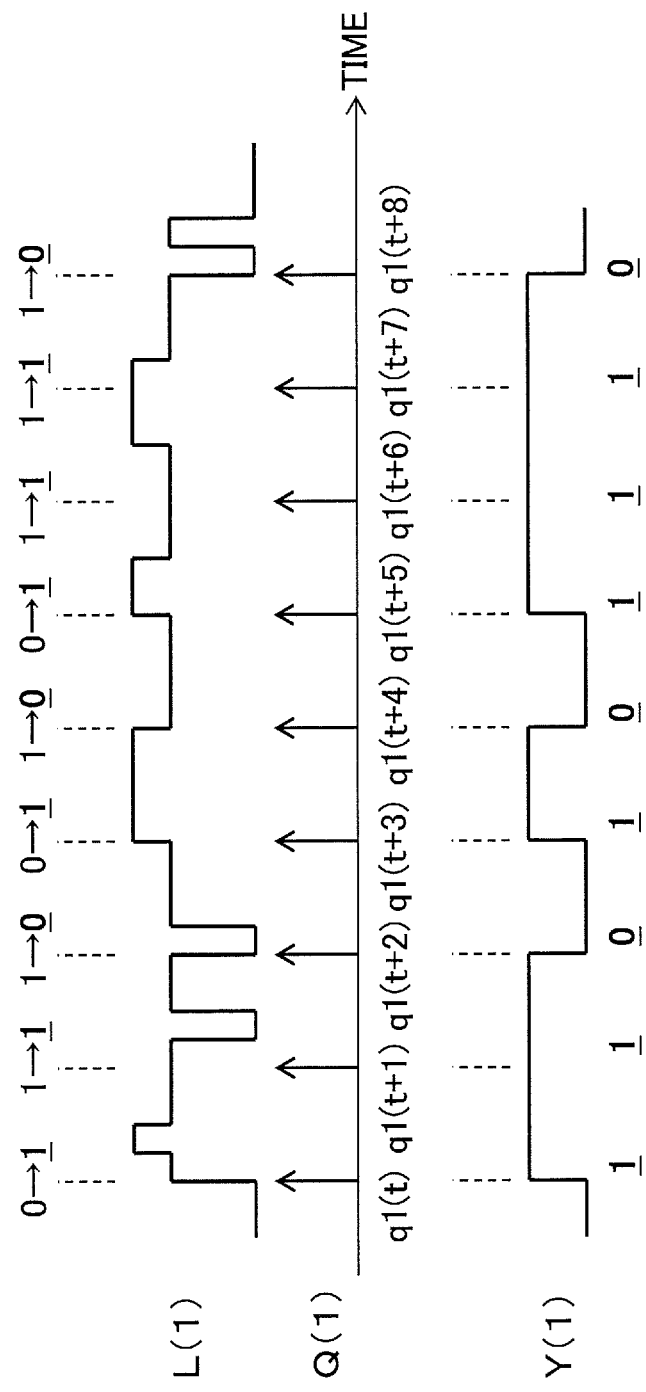
FIG. 14 is a timing diagram showing an operation example of an information detector of the optical signal reception device shown in FIG. 4.

FIG. 14 is a timing diagram showing an operation example of the information detector 23 of the optical signal reception device 2 shown in FIG. 4. The analysis signal L(1) shown in FIG. 14 is a signal obtained by adding the pulse signal sequences P(1) to P(3) shown in FIG. 12. Since the control signal detector 22 outputs a synchronization signal Q(1) indicating the sampling timing corresponding to the desired signal of k=1, variations in the value of L(1) are monitored each time Q(1) rises.

For example, since L(1) rises (changes) at the timing of time position q1(t) in FIG. 14, it is judged that the value is 0 immediately before the change and becomes 1 immediately after the change (indicated as '0→1' in FIG. 14). Here, t is a positive integer.

Likewise, since L(1) does not change at the timing of time position q1(t+1), it is judged that the value 1 is retained (indicated as '1→1' in FIG. 14).

Likewise again, since L(1) falls (changes) at the timing of time position q1(t+2), it is judged that the value is 1 immediately before the change and becomes 0 immediately after the change (indicated as '1→0' in FIG. 14).

Likewise further, a change indicated as '0→1' occurs at the timing of time position q1(t+3) as shown in FIG. 14; a change indicated as '1→0' occurs at the timing of time position q1(t+4) as shown in FIG. 14; a change indicated as '0→1' occurs at the timing of time position q1(t+5) as shown in FIG. 14; no change occurs at the timing of time position q1(t+6) as indicated by '1→1' in FIG. 14; no change occurs at the timing of time position q1(t+7) as indicated by '1→1' in FIG. 14; a change indicated as '1→0' occurs at the timing of time position q1(t+8) as shown in FIG. 14.

By repeating such judgments, it is detected that the restored signal sequence Y(1) is "110101110 . . . ". Since this is the same signal as the multiplexed signal sequence E(1) in FIG. 12, the transmission information sequence X(1) has been restored accurately.

<1-3> Effect of First Embodiment

Applying the optical communication system of the first embodiment enables the optical signal generation device 1 to generate the control signals A(k) containing the identification signals H(k) corresponding to a plurality of information sequences and to output a plurality of information sequences T(k) obtained by multiplexing the control signals, individually at different times. Consequently, by detecting the identification signal by the optical signal reception device 2, a time at which a desired optical modulation signal is received is known simultaneously with the detection, and therefore it is possible to suppress interference by optical signals emitted from a plurality of light sources and to detect only the desired optical signal accurately, while stable illumination intensity is maintained.

<2> Second Embodiment

An optical communication system according to a second embodiment differs from the optical communication system according to the first embodiment in part of the operation of the timing manager of the optical signal generation device. Except for this point, the optical communication system according to the second embodiment is the same as the optical communication system according to the first embodiment. Therefore, in the description of the second embodiment, FIG. 3 and FIG. 4 will also be referred to.

In the timing manager 12 of the second embodiment, signal rates in some of N types of information sequences differ from the others. In this case, if some minimum pulse widths of pulse signals in the some sequences of the N types of information sequences differ from the others due to the difference in signal rate, the timing manager 12 selects the minimum pulse widths from all the information sequences and outputs N types of timing signals S(1) to S(N) whose values change on a cycle of the minimum pulse width. However, time positions at which the respective values of S(1) to S(N) change are times which all differ from one another. It is preferable to configure the timing signals S(1) to S(N) so that their values change in synchronization with a boundary between slots, by using, as a time width of the slot, a time width obtained by dividing the minimum pulse width mentioned earlier by a value not smaller than the number of the information sequences mentioned earlier.

If the minimum pulse width of the pulse signal corresponding to a kth information sequence is $1/fs_k$ [seconds] ($fs_k$ [Hz] is the signal rate of the kth information sequence), the timing signals S(1) to S(N) can be defined as given by expression (4), for example.

$$S(k)=(k-1)\times(1/fs_j)/(N+n) \qquad (4)$$

Here, k is an integer satisfying 1≤k≤N, n is an integer not smaller than 0, j is an integer not smaller than 1, and $fs_k$ $fs_j$.

Figure 15:
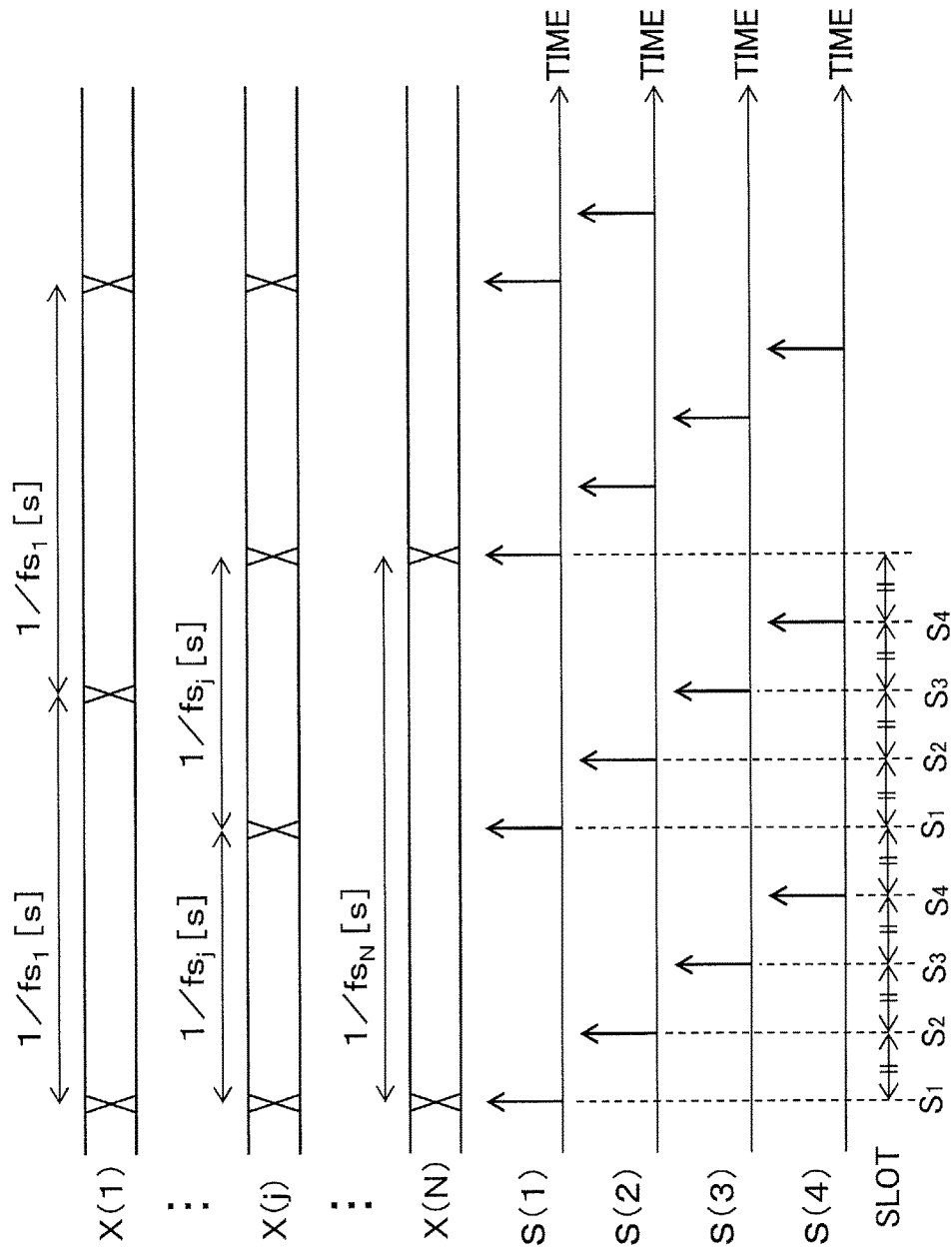
FIG. 15 is a timing diagram showing an operation example of a timing manager of an optical signal generation device according to a second embodiment of the present invention.

FIG. 15 is a timing diagram showing an operation example of the timing manager of the optical signal generation device according to the second embodiment of the present invention. FIG. 15 shows the timing signals S(1) to S(N) output when N=4 and n=0 in expression (2). FIG. 15 shows an example in which components, each of which is one bit of a digital signal, of the transmission information sequences X(1) to X(N) forms one pulse width.

Figure 16:
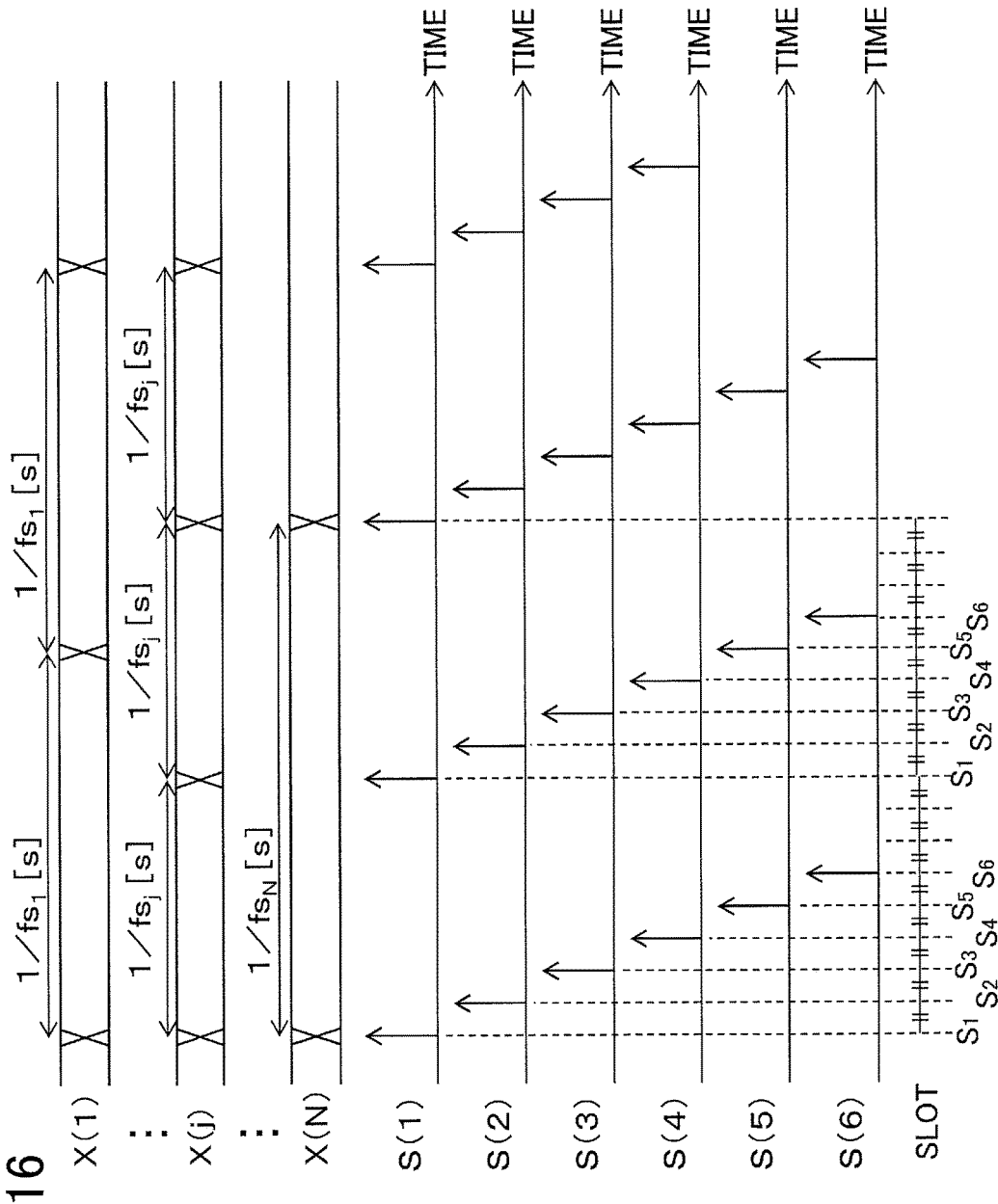
FIG. 16 is a timing diagram showing another operation example of the timing manager of the optical signal generation device according to the second embodiment.

FIG. 16 is a timing diagram showing another operation example of the timing manager of the optical signal generation device according to the second embodiment. FIG. 16 shows the timing signals S(1) to S(N) output when N=6 and n=2 in expression (2). FIG. 16 shows an example in which components, each of which is one bit of a digital signal, of the transmission information sequences X(1) to X(N) forms one pulse width.

The timing signals S(1) to S(N) can also be defined as given by expression (5), for example. However, as a value of c, different values are selected with respect to the N types of timing signals S(1) to S(k).

$$S(k)=(c-1)\times(1/fs)/(N+n) \qquad (5)$$

Here, c ∈{1, 2, . . . , N}.

Figure 17:
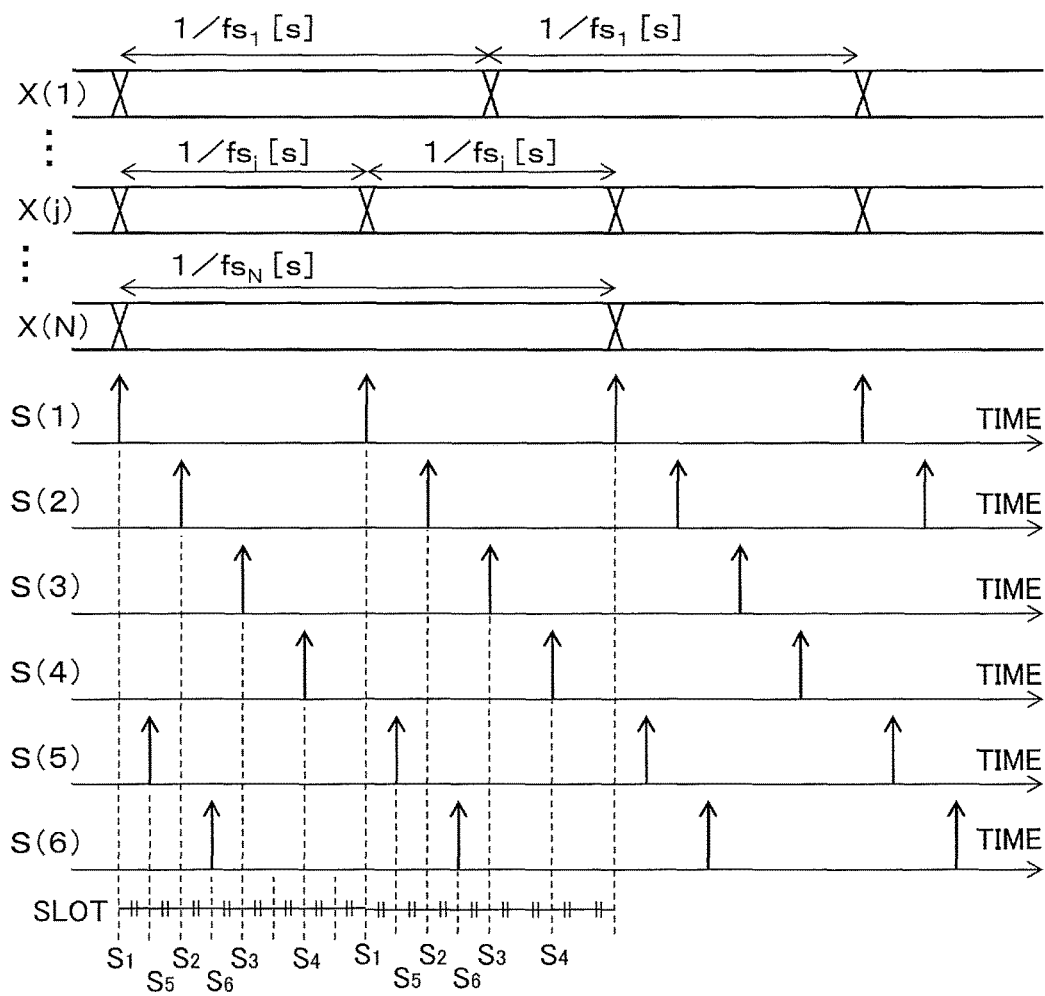
FIG. 17 is a timing diagram showing a further operation example of the timing manager of the optical signal generation device according to the second embodiment.

FIG. 17 is a timing diagram showing a further operation example of the timing manager of the optical signal generation device according to the second embodiment. FIG. 17 shows an example of the timing signals S(1) to S(N) output when N=6 and n=2 in expression (3). In the cases of FIG. 15 and FIG. 16, the value of k is incremented by 1, starting from 1, and a smaller value of k represents an earlier time position of the rising time positions of the timing signals (that is, the rising time positions are in the order of $S_1$, $S_2$, $S_3$, $S_4$, $S_5$, and $S_6$). In contrast to this, in FIG. 17, since the value of c in expression (5) can be varied as desired, the rising time positions of the timing signals S(1) to S(6) can be adjusted freely, for example, in the order of $S_1$, $S_5$, $S_2$, $S_6$, $S_3$, and $S_4$, as shown in FIG. 17.

Applying the optical communication system of the second embodiment enables the optical signal generation device to generate control signals containing identification signals corresponding to a plurality of information sequences and to output a plurality of information sequences into which the control signals are multiplexed, individually at different times, even if signal rates for the information sequences differ from one another. Consequently, by detecting the identification signal by the optical signal reception device, a time at which a desired optical modulation signal is received is known simultaneously with the detection, and therefore it is possible to suppress interference by optical signals emitted from a plurality of light sources and to detect only the desired optical signal accurately, while stable illumination intensity is maintained.

<3> Third Embodiment

In an optical communication system according to a third embodiment, part of operation of the signal multiplexer of the optical signal generation device differs from that in the optical communication system according to the first embodiment. Except for this point, the optical communication system according to the third embodiment is the same as the optical communication system according to the first embodiment. Therefore, in the description of the third embodiment, FIG. 3 and FIG. 4 will also be referred to.

Figure 18:
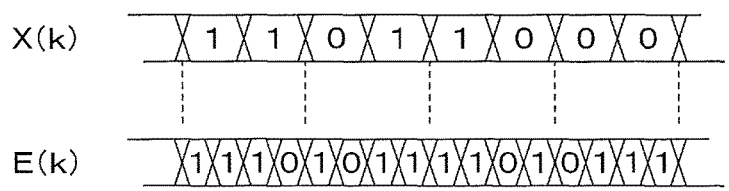
FIG. 18 is a timing diagram showing an operation example of each of signal multiplexers of an optical signal generation device according to a third embodiment of the present invention.

FIG. 18 is a timing diagram showing an operation example of each signal multiplexer of the optical signal generation device according to the third embodiment of the present invention. FIG. 18 shows an example of modulation that can be performed by the signal multiplexer 13 in the third embodiment. The signal multiplexer 13 in the third embodiment has a function of generating a modulation signal by modulating a kth transmission information sequence X(k) and has a function of multiplexing in a time-division manner the modulation signal and a control signal A(k) and outputting a multiplexed signal sequence E(k). The optical signal generation device according to the third embodiment includes a plurality of signal multiplexers 13 having the same functions for the N types of transmission information sequences X(1) to X(N).

As shown in FIG. 18, the signal multiplexer 13 performs modulation of the transmission information sequence X(k) at its double rate and generates a multiplexed signal sequence E(k). FIG. 18, however, shows an example in a time zone not including the control signal A(k). In that case, when X(k)="00", modulation results in E(k)="0111"; when X(k)="01", modulation results in E(k)="1011"; when X(k)="10", modulation results in E(k)="1101"; when X(k)="11", modulation results in E(k)="1110". As long as the modulation result is represented by 1 or 0, the modulation method is not limited to the one shown here.

If the minimum pulse width of the pulse signal corresponding to the kth transmission information sequence X (k) is 1/fm [seconds] (fm [Hz] is the modulation rate of the multiplexed signal), the timing signals S(1) to S(N) can be defined as given by expression (6).

$$S(k)=(k-1)\times(1/fm)/(N+n) \qquad (6)$$

Here, k is an integer satisfying 1≤k≤N, and n is an integer not smaller than 0.

Figure 19:
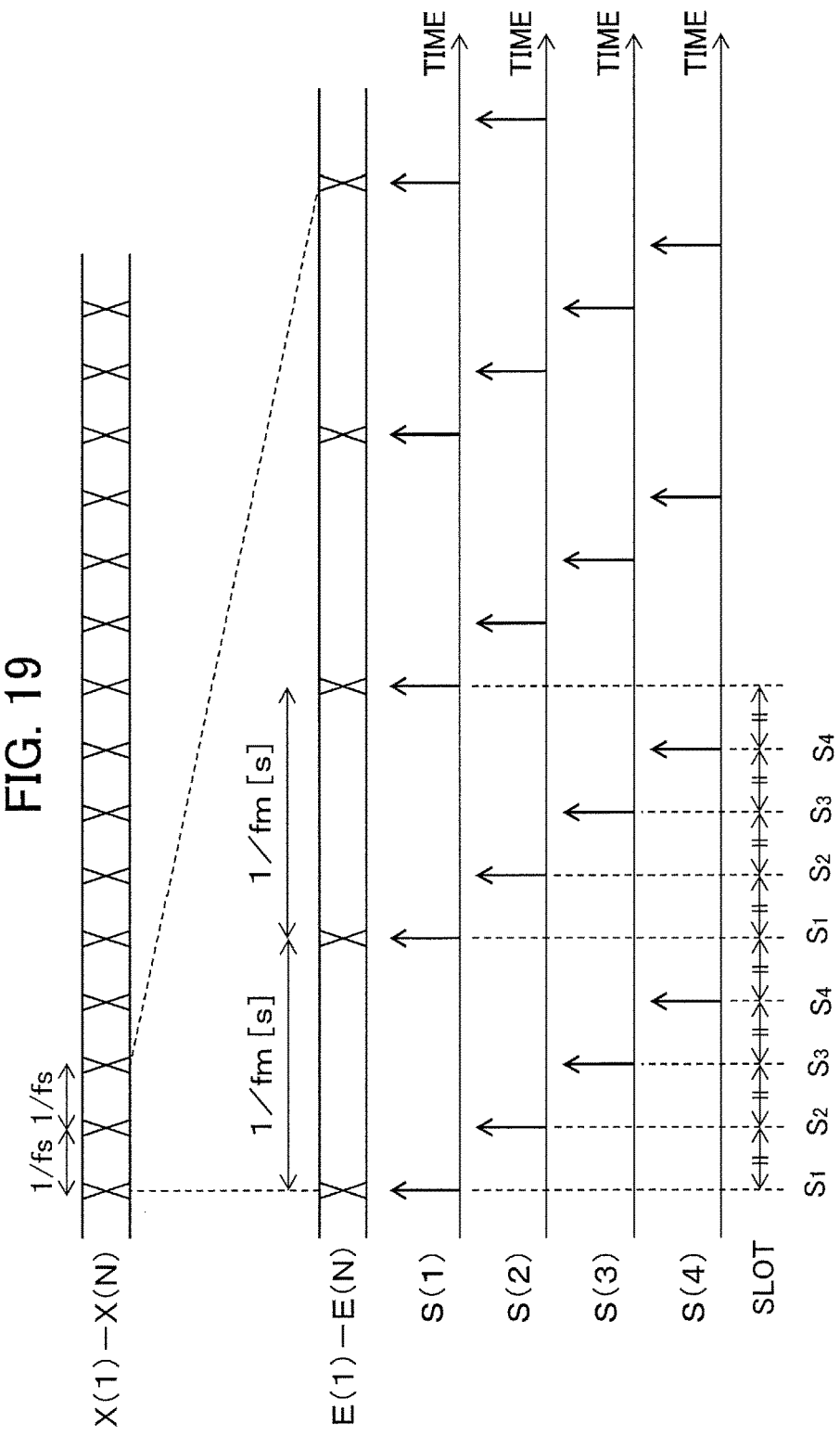
FIG. 19 is a timing diagram showing an operation example of a timing manager of the optical signal generation device according to the third embodiment.

FIG. 19 is a timing diagram showing an operation example of the timing manager of the optical signal generation device according to the third embodiment. FIG. 19 shows time positions $S_1$ to $S_4$ at which the timing signals S(1) to S(4) are output when N=4 and n=0 in expression (2). FIG. 19 shows an example in which twice the rate of digital signals forming the transmission information sequences X(1) to X(N) becomes the rate of the multiplexed signal.

Figure 20:
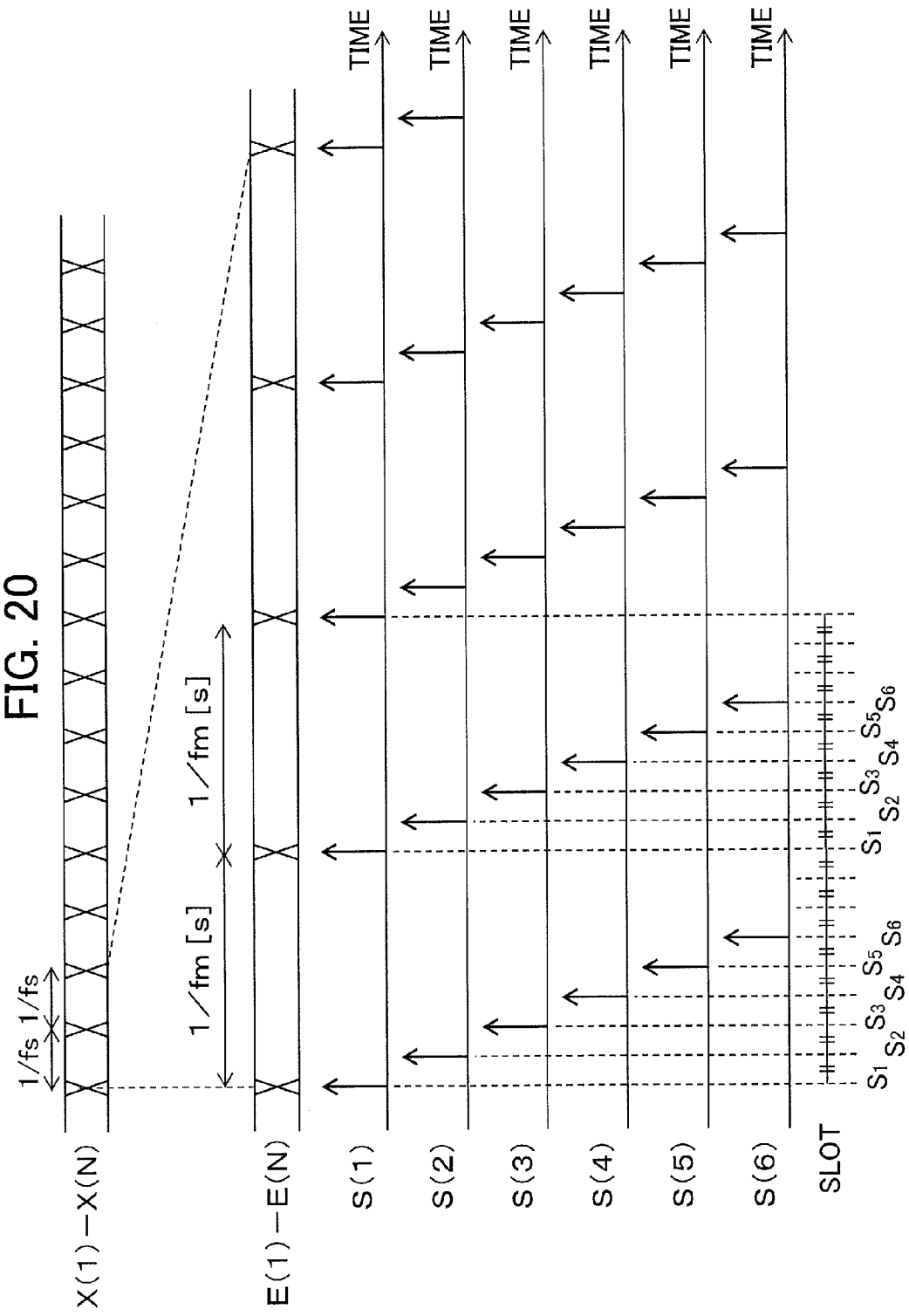
FIG. 20 is a timing diagram showing another operation example of the timing manager of the optical signal generation device according to the third embodiment.

FIG. 20 is a timing diagram showing another operation example of the timing manager of the optical signal generation device according to the third embodiment. FIG. 20 shows the timing signals S(1) to S(N) output when N=6 and n=2 in expression (6). FIG. 20 shows an example in which twice the rate of digital signals forming the transmission information sequences X(1) to X(N) becomes the rate of the multiplexed signal.

The timing signals S(1) to S(N) can also be defined as given by expression (7), for example. Here, as a value of c, different values are selected with respect to the N types of timing signals S(1) to S(k).

$$S(k)=(c-1)\times(1/\text{fm})/(N+n) \quad (7)$$

Here, $c \in \{1, 2, \ldots, N\}$.

Figure 21:
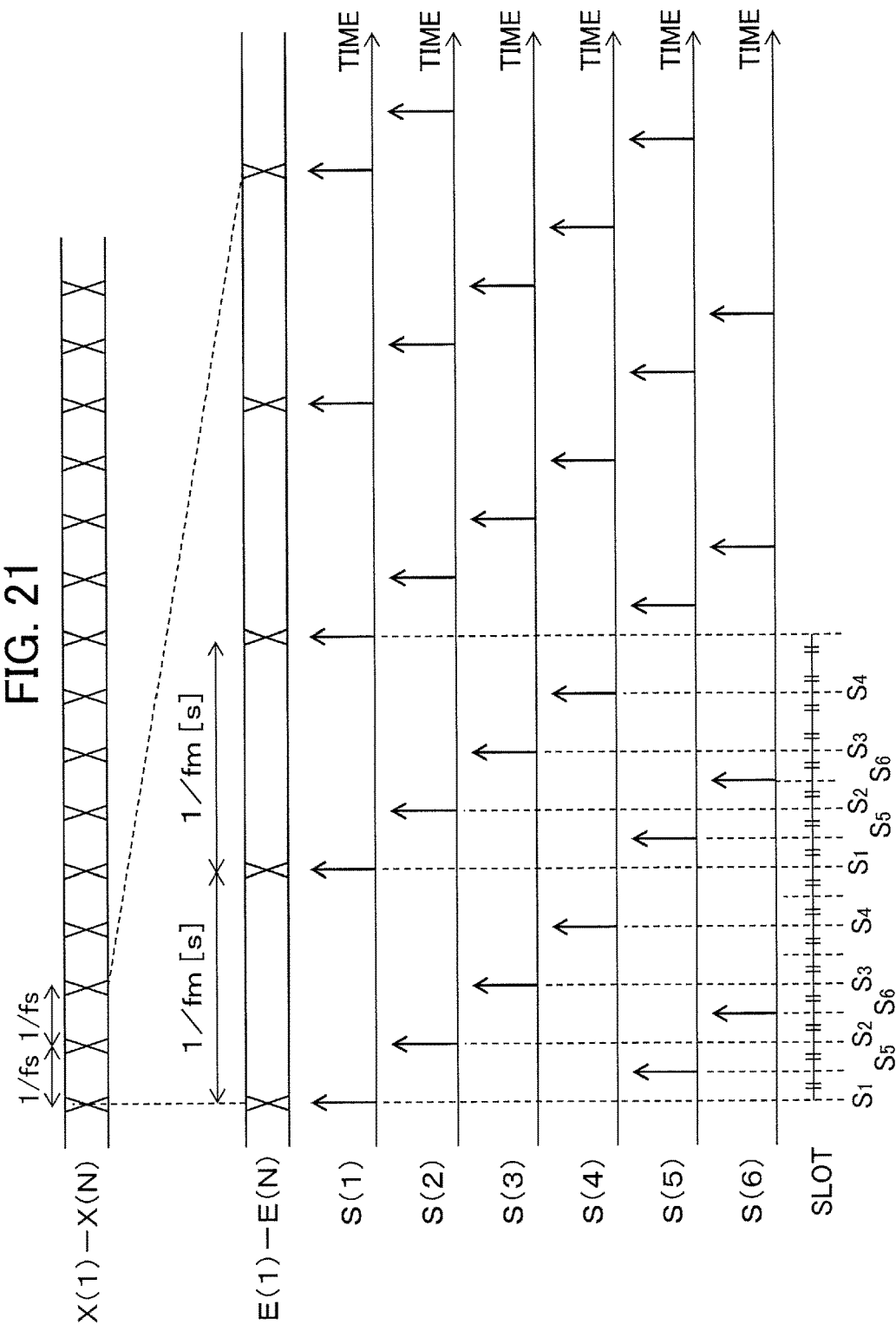
FIG. 21 is a timing diagram showing a further operation example of the timing manager of the optical signal generation device according to the third embodiment.

FIG. 21 is a timing diagram showing a further operation example of the timing manager of the optical signal generation device according to the third embodiment. FIG. 21 shows an example of the timing signals S(1) to S(N) output when N=6 and n=2 in expression (3). In the case of expression (6), a closer value of k makes the rising time position of the timing signal closer, but in the case of expression (7), adjustment can be made in such a manner that that is not always the case.

Applying the optical communication system of the third embodiment enables the optical signal generation device to generate control signals containing identification signals corresponding to a plurality of information sequences and to output a plurality of information sequences into which the control signals are multiplexed, individually at different times, even if signal rates for the information sequences differ from one another. Consequently, by detecting the identification signal by the optical signal reception device, a time at which a desired optical modulation signal is received is known simultaneously with the detection, and therefore it is possible to suppress interference by optical signals emitted from a plurality of light sources and to detect only the desired optical signal accurately, while stable illumination intensity is maintained.

<4> First Modified Example

Figure 22:
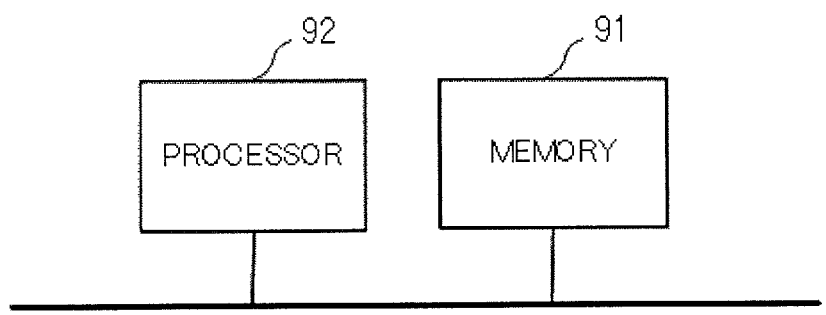
FIG. 22 is a hardware configuration diagram showing a configuration of a modified example of the optical signal generation devices according to the first to third embodiments.

FIG. 22 is a hardware configuration diagram showing the configuration of a modified example of the optical signal generation device 1 according to the first to third embodiments. The optical signal generation device 1 shown in FIG. 3 can be implemented (e.g., by a computer) by using a memory 91, which is a storage device for storing a program as software, and a processor 92, which is an information processing unit for executing a program stored in the memory 91. In this case, the control signal manager 11, the timing manager 12, the signal multiplexer 13, the pulse converter 14, and part of the transmission processing unit 15 in FIG. 3 can be implemented by the processor 92 which executes programs.

Figure 23:
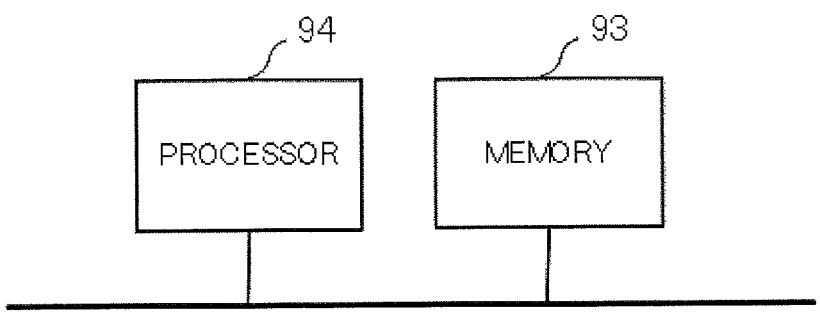
FIG. 23 is a hardware configuration diagram showing a configuration of a modified example of the optical signal reception devices according to the first to third embodiments.

In addition, FIG. 23 is a hardware configuration diagram showing the configuration of a modified example of the optical signal reception device 2 according to the first to third embodiments. The optical signal reception device 2 shown in FIG. 4 can be implemented (e.g., by a computer) by using a memory 93, which is a storage device for storing a program as software, and a processor 94, which is an information processing unit for executing a program stored in the memory 93. In this case, part of the reception processing unit 21, the control signal detector 22, and the information detector 23 in FIG. 4 can be implemented by the processor 94 which executes programs.

<5> Second Modified Example

The optical communication systems according to the first to third embodiments exemplify the optical communication system to which the present invention is applied, and the present invention is not limited to those described here. In addition, the optical signal generation devices and the optical signal reception devices described in the first to third embodiments exemplify the optical signal generation device and the optical signal reception device to which the present invention is applied, and the present invention is not limited to those described here.

DESCRIPTION OF REFERENCE CHARACTERS

1 optical signal generation device; 2 optical signal reception device; 11 control signal manager; 12 timing manager; 13 signal multiplexer; 14 pulse converter; 15 transmission processing unit; 21 reception processing unit; 22 control signal detector; 23 information detector; X(k) transmission information sequence; N number of information sequences; E(k) multiplexed signal; A(k) control signal; S(k) timing signal; $S_k$ time position based on timing signal; P(k) pulse signal sequence; T(k) transmission signal sequence; R(k) reception signal sequence; L(k) analysis signal; Q(K) synchronization signal; Y(k) information sequence.

What is claimed is:

1. An optical communication system comprising an optical signal generation device and an optical signal reception device;

the optical signal generation device including:
a control signal manager that outputs an information sequence number indicating a number of N transmission information sequences, N being an integer not smaller than 2, and N control signals corresponding to the N transmission information sequences;
a timing manager that outputs N timing signals indicating time positions different from one another;
N signal multiplexers that multiplex in a time-division manner transmission information sequences and control signals corresponding to each other, of the N transmission information sequences and the N control signals, and thereby generate N multiplexed signal sequences;
N pulse converters that convert the N multiplexed signal sequences to N pulse signal sequences whose values change at the time positions based on the N timing signals corresponding to the N multiplexed signal sequences; and
N transmission processing units that send N transmission signal sequences whose intensities correspond to values of the N pulse signal sequences; and
the optical signal reception device including:
M reception processing units that receive M signal sequences of the N transmission signal sequences as reception signal sequences, M being a positive integer, convert intensities of the M reception signal sequences to amplitude, and thereby generate M analysis signals;
M control signal detectors that generate M synchronization signals that periodically vary, from the M analysis signals; and
M information detectors that detect M reception information sequences from the M analysis signals, based on periods of the M synchronization signals; wherein:
the N control signals include identification signals that allow each of the N transmission information sequences to be identified; and
the N timing signals are signals whose values change on a cycle of a minimum pulse width of the N pulse signal sequences, and the time positions at which values of the N timing signals vary are different from one another.

2. The optical communication system according to claim 1, wherein each of the N timing signals has a time width obtained by dividing the minimum pulse width by a value not smaller than the number of the N transmission information sequences as a time width of a slot and is a signal whose value changes in synchronization with a boundary of the slot.

3. The optical communication system according to claim 1, wherein:
the M control signal detectors generate the M synchronization signals, based on signs representing changes in values of the M analysis signals; and
the M information detectors generate the M reception information sequences, based on the M synchronization signals and signs representing changes in the values of the M analysis signals.

4. The optical communication system according to claim 1, wherein the N control signals include preamble signals indicating starting time positions of the N transmission information sequences.

5. The optical communication system according to claim 1, wherein the N signal multiplexers
generate N modulation signals by modulating the N transmission information sequences, and
generate the N multiplexed signal sequences by multiplexing in a time-division manner the N control signals and the N modulation signals respectively.

6. The optical communication system according to claim 1, wherein N indicating a number of the transmission signal sequences equals M indicating a number of the reception signal sequences.

7. The optical communication system according to claim 1, wherein:
each of the N transmission processing units includes a light emitting element; and
the light emitting element is an illumination lamp.

8. The optical communication system according to claim 2, wherein:
the M control signal detectors generate the M synchronization signals, based on signs representing changes in values of the M analysis signals; and
the M information detectors generate the M reception information sequences, based on the M synchronization signals and signs representing changes in the values of the M analysis signals.

9. The optical communication system according to claim 2, wherein the N control signals include preamble signals indicating starting time positions of the N transmission information sequences.

10. The optical communication system according to claim 3, wherein the N control signals include preamble signals indicating starting time positions of the N transmission information sequences.

11. An optical signal generation device comprising:
a control signal manager that outputs an information sequence number indicating a number of N transmission information sequences, N being an integer not smaller than 2, and N control signals corresponding to the N transmission information sequences;
a timing manager that outputs N timing signals indicating time positions different from one another;
N signal multiplexers that multiplex in a time-division manner transmission information sequences and control signals corresponding to each other, of the N transmission information sequences and the N control signals, and thereby generate N multiplexed signal sequences;
N pulse converters that convert the N multiplexed signal sequences to N pulse signal sequences whose values change at the time positions based on the N timing signals corresponding to the N multiplexed signal sequences; and
N transmission processing units that send N transmission signal sequences whose intensities correspond to the values of the N pulse signal sequences; wherein:
the N control signals include identification signals that allow each of the N transmission information sequences to be identified; and
the N timing signals are signals whose values change on a cycle of a minimum pulse width of the N pulse signal sequences, and the time positions at which the values of the N timing signals vary are different from one another.

12. The optical signal generation device according to claim 11, wherein each of the N timing signals has a time width obtained by dividing the minimum pulse width by a value not smaller than the number of the N transmission information sequences as a time width of a slot and is a signal whose value changes in synchronization with a boundary of the slot.

13. The optical signal generation device according to claim 11, wherein the N control signals include preamble signals indicating starting time positions of the N transmission information sequences.

14. The optical signal generation device according to claim 11, wherein the signal multiplexers
generate N modulation signals by modulating the N transmission information sequences, and
generate the N multiplexed signal sequences by multiplexing in a time-division manner the N control signals and the N modulation signals respectively.

15. The optical signal generation device according to claim 11, wherein:
each of the N transmission processing units includes a light emitting element; and
the light emitting element is an illumination lamp.

16. The optical signal generation device according to claim 12, wherein the N control signals include preamble signals indicating starting time positions of the N transmission information sequences.

17. The optical signal generation device according to claim 12, wherein the signal multiplexers
generate N modulation signals by modulating the N transmission information sequences, and
generate the N multiplexed signal sequences by multiplexing in a time-division manner the N control signals and the N modulation signals respectively.

18. The optical signal generation device according to claim 13, wherein the signal multiplexers
generate N modulation signals by modulating the N transmission information sequences, and
generate the N multiplexed signal sequences by multiplexing in a time-division manner the N control signals and the N modulation signals respectively.

* * * * *